(12) United States Patent
Spivak

(10) Patent No.: US 12,139,060 B2
(45) Date of Patent: Nov. 12, 2024

(54) INTEGRALLY MOLDED RECREATIONAL VEHICLE BODY

(71) Applicant: Paul Spivak, Euclid, OH (US)

(72) Inventor: Paul Spivak, Euclid, OH (US)

( * ) Notice: Subject to any disclaimer, the term of this patent is extended or adjusted under 35 U.S.C. 154(b) by 709 days.

(21) Appl. No.: 17/333,352

(22) Filed: May 28, 2021

(65) Prior Publication Data

US 2022/0379796 A1  Dec. 1, 2022

(51) Int. Cl.
*B60P 3/36* (2006.01)
*B62D 23/00* (2006.01)
*B62D 33/04* (2006.01)

(52) U.S. Cl.
CPC .............. *B60P 3/36* (2013.01); *B62D 23/005* (2013.01); *B62D 33/044* (2013.01)

(58) Field of Classification Search
CPC ........ B62D 23/005; B62D 33/044; B60P 3/36
USPC ............................................. 296/900, 901.01
See application file for complete search history.

(56) References Cited

U.S. PATENT DOCUMENTS

| | | | | |
|---|---|---|---|---|
| 4,491,362 A * | 1/1985 | Kennedy | ............. | B62D 29/046 |
| | | | | 296/187.02 |
| 5,009,463 A * | 4/1991 | Saitoh | ..................... | B60J 1/008 |
| | | | | 296/210 |
| 6,250,410 B1 * | 6/2001 | Balestrini | ............. | B60N 2/015 |
| | | | | 180/68.5 |
| 7,000,978 B1 * | 2/2006 | Messano | ............. | B62D 29/046 |
| | | | | 296/181.6 |

FOREIGN PATENT DOCUMENTS

| | | | |
|---|---|---|---|
| EP | 2 615 013 A1 | | 7/2013 |
| EP | 3 012 175 A1 | | 4/2016 |
| GB | 2 311 966 A | | 10/1997 |
| JP | 2002121425 | * | 4/2002 |
| WO | 2008/067583 A1 | | 6/2008 |

OTHER PUBLICATIONS

Extended European Search Report issued in corresponding application, EP 22175615.8-1009, dated Oct. 14, 2022.

\* cited by examiner

*Primary Examiner* — Joseph D. Pape
(74) *Attorney, Agent, or Firm* — Pearne & Gordon LLP

(57) ABSTRACT

A recreational vehicle body includes a base and a chassis integrally molded with the base, the chassis including a plurality of ribs that extend downward from the base. The recreational vehicle body includes one or more layers that are molded to integrally form the base and chassis.

13 Claims, 9 Drawing Sheets

INTEGRALLY MOLDED RECREATIONAL VEHICLE BODY

FIELD OF INVENTION

The following description relates to a recreational vehicle body, and more particularly an integrally molded recreational vehicle body.

BACKGROUND OF THE INVENTION

A recreational vehicle is a trailer or motorized vehicle that includes living quarters designed for accommodation such as, for example, a kitchen, a bathroom, and one or more sleeping facilities. Common types of recreational vehicles include motorhomes, campervans, caravans (also known as travel trailers and camper trailers), fifth-wheel trailers, popup campers, and truck campers.

Recreational vehicles typically include a cabin body that is built using a molding process in which a female (negative) mold of the body is first constructed, and then layers of fiber-reinforced-plastic are applied within the mold to form the body. The body is then mounted on and attached to a separate metal chassis for support and rigidity. Moreover, electrical wiring, piping, or other utility members are then installed, which can extend along the interior and/or exterior of the cabin body.

BRIEF SUMMARY

In accordance with a first aspect, a recreational vehicle body includes a base; and a chassis integrally molded with the base, the chassis including a plurality of ribs that extend downward from the base. The recreational vehicle body includes one or more layers that are molded to integrally form the base and chassis.

In accordance with a second aspect, a recreational vehicle body includes a base; a chassis integrally molded with the base, the chassis including a plurality of ribs that extend downward from the base; and a utility member. The recreational vehicle body includes a plurality of layers that are stacked and bonded together to encapsulate at least a portion of the utility member and integrally form the base and chassis.

In accordance with a third aspect, a recreational vehicle body includes a utility member; and a plurality of layers that are stacked and bonded together to encapsulate at least a portion of the utility member.

BRIEF DESCRIPTION OF THE DRAWINGS

Embodiments of the invention are better understood when the following detailed description is read with reference to the accompanying drawings, in which.

DETAILED DESCRIPTION

Figure 1:
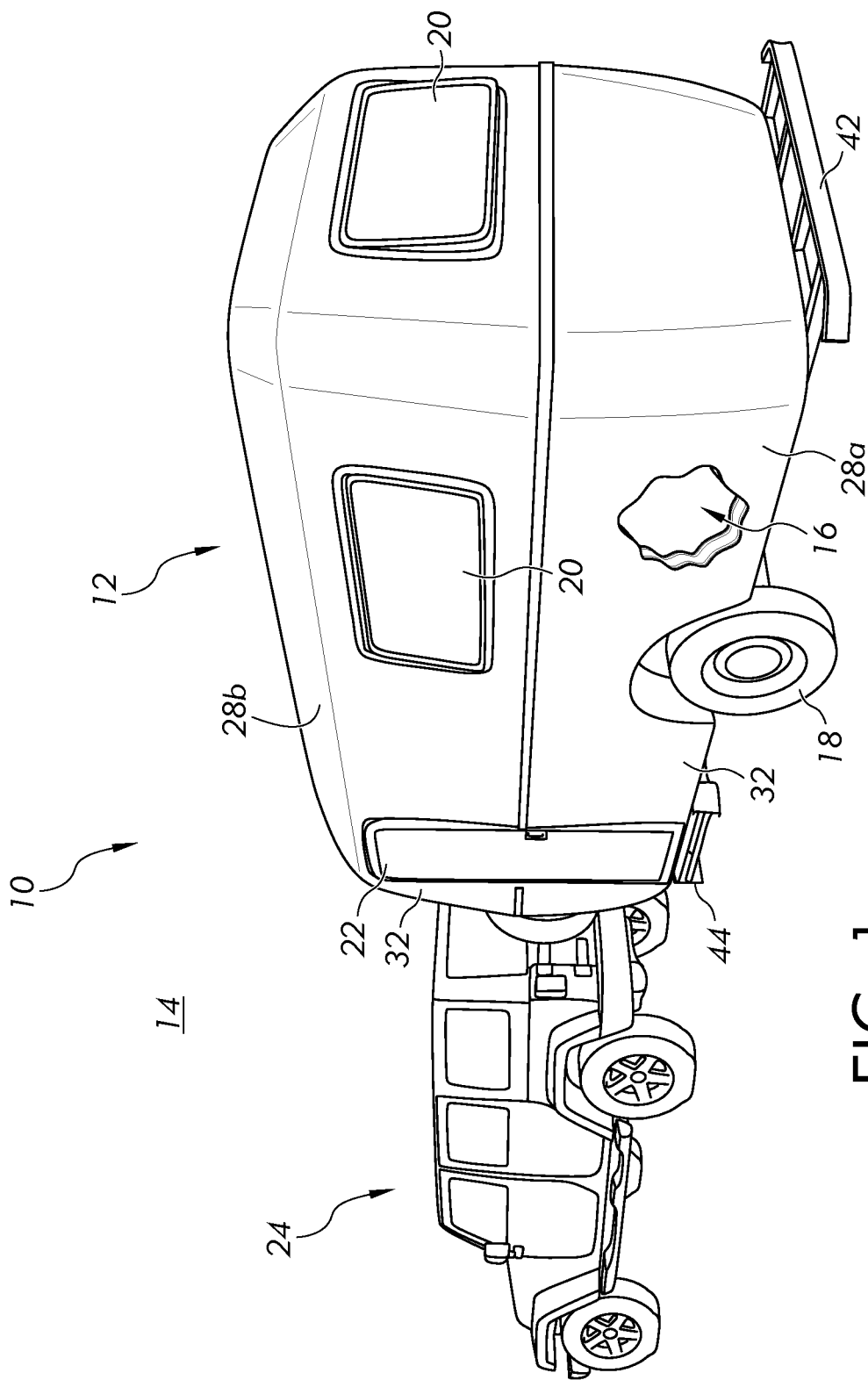
FIG. 1 is a perspective view of a recreational vehicle.
Figure 2:
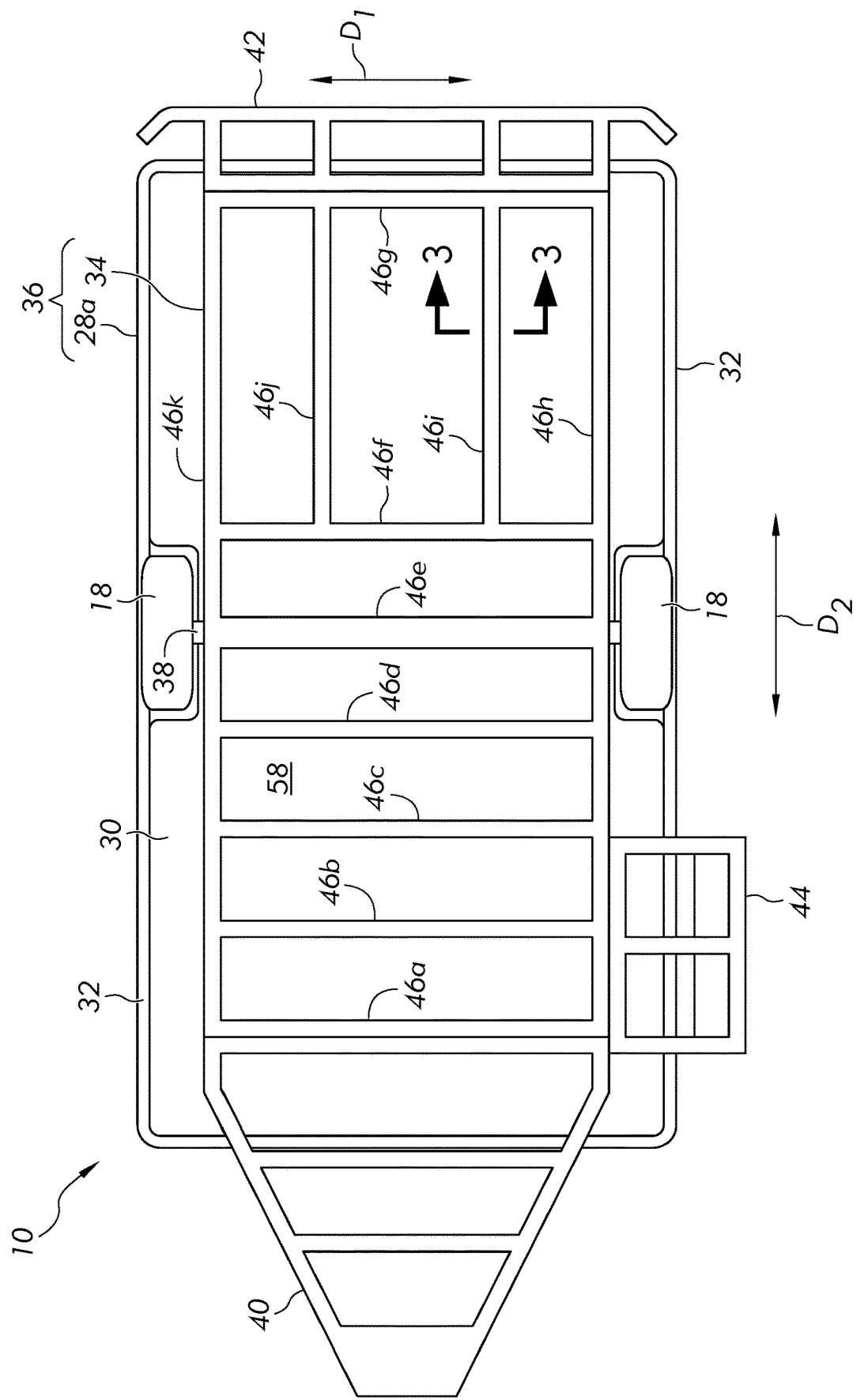
FIG. 2 is a bottom plan view of the recreational vehicle.

Turning to FIGS. 1 & 2, a recreational vehicle 10 is shown that includes a cabin 12 defining an exterior 14 and an interior 16 of the cabin 12. The recreational vehicle 10 further includes a plurality of wheels 18 supporting the cabin 12, a plurality of windows 20, and a door 22 for providing selective access to the interior 16 of the cabin 12. The recreational vehicle 10 in the present example is an unpowered trailer that offers mobile living accommodations within its interior 16 (e.g., a kitchen, a bathroom, and one or more sleeping facilities) and can be coupled to a motorized vehicle 24 for towing. However, the recreational vehicle 10 can be other types of recreational vehicles in other embodiments such as, for example, a self-propelled motorhome.

The cabin 12 of the recreational vehicle 10 includes a first shell member 28a (i.e., a lower half shell) and a second shell member 28b (i.e., an upper half shell). The shell members 28a, 28b are each formed using a molding process and then assembled together (e.g., with fasteners) to form the cabin 12. Each shell member 28a, 28b is a substantially dome-shaped body having a base 30 (e.g., floor or ceiling) and a plurality of side walls 32 that extend (e.g., upward or downward) from a perimeter of the base 30. When assembled together, the shell members 28a, 28b collectively define the exterior 14 and interior 16 of the cabin 12. However, the number and shapes of members forming the cabin 12 can vary by embodiment. For instance, the cabin 12 in some examples can comprise a plurality of panel members that each define a separate wall of the cabin 12.

The recreational vehicle 10 further includes a chassis 34 that, as discussed further below, is integrally molded with the shell member 28a such that the shell member 28a and chassis 34 are components of a single, integrated body 36. The chassis 34 is configured to support and provide rigidity to the shell member 28a. Moreover, the chassis 34 is configured to provide points of attachment for other components of the recreational vehicle 10. For example, the recreational vehicle 10 includes an axle 38 that is connected to its wheels 18 and rotatably coupled to the chassis 34 via one or more bearing elements. Furthermore, the recreational vehicle 10 includes a tongue frame 40, a tail frame 42, and a step assembly 44 that are fixed to the chassis 34 via fasteners.

The chassis 34 includes a plurality of ribs 46 that extend downward from the base 30 of the shell member 28a. In particular, the chassis 34 includes a plurality of first ribs 46a-g that extend longitudinally in a first direction $D_1$ and a plurality of second ribs 46h-k that extend longitudinally in a second direction $D_2$ that is transverse to the first direction $D_1$. In the present embodiment, the first and second directions $D_1$, $D_2$ are substantially perpendicular to each other such that the ribs 46 intersect with each other at substantially perpendicular angles (for the purposes of this disclosure, "substantially perpendicular" as used herein means within 10° or less of perpendicular, and preferably within 5° or less of perpendicular). Moreover, the ribs 46a, 46g, 46h, 46k form a rectangular frame, while the ribs 46b-f, 46i, 46j form crossmembers within the frame that extend either partially (see e.g., ribs 46i, 46j) or completely (see e.g., ribs 46b-f) across the frame. These configurations of the ribs 46 can enhance the overall strength and rigidity of the chassis 34. However, the chassis 34 may include additional or alternative ribs 46 that extend at other angles oblique to the first and second directions $D_1$, $D_2$. Moreover, the number of total ribs 46 can vary in other embodiments. Broadly speaking, the chassis 34 can comprise any number and configuration of longitudinal ribs 46 that extend downward from the base 30 of the shell member 28a.

Figure 3:
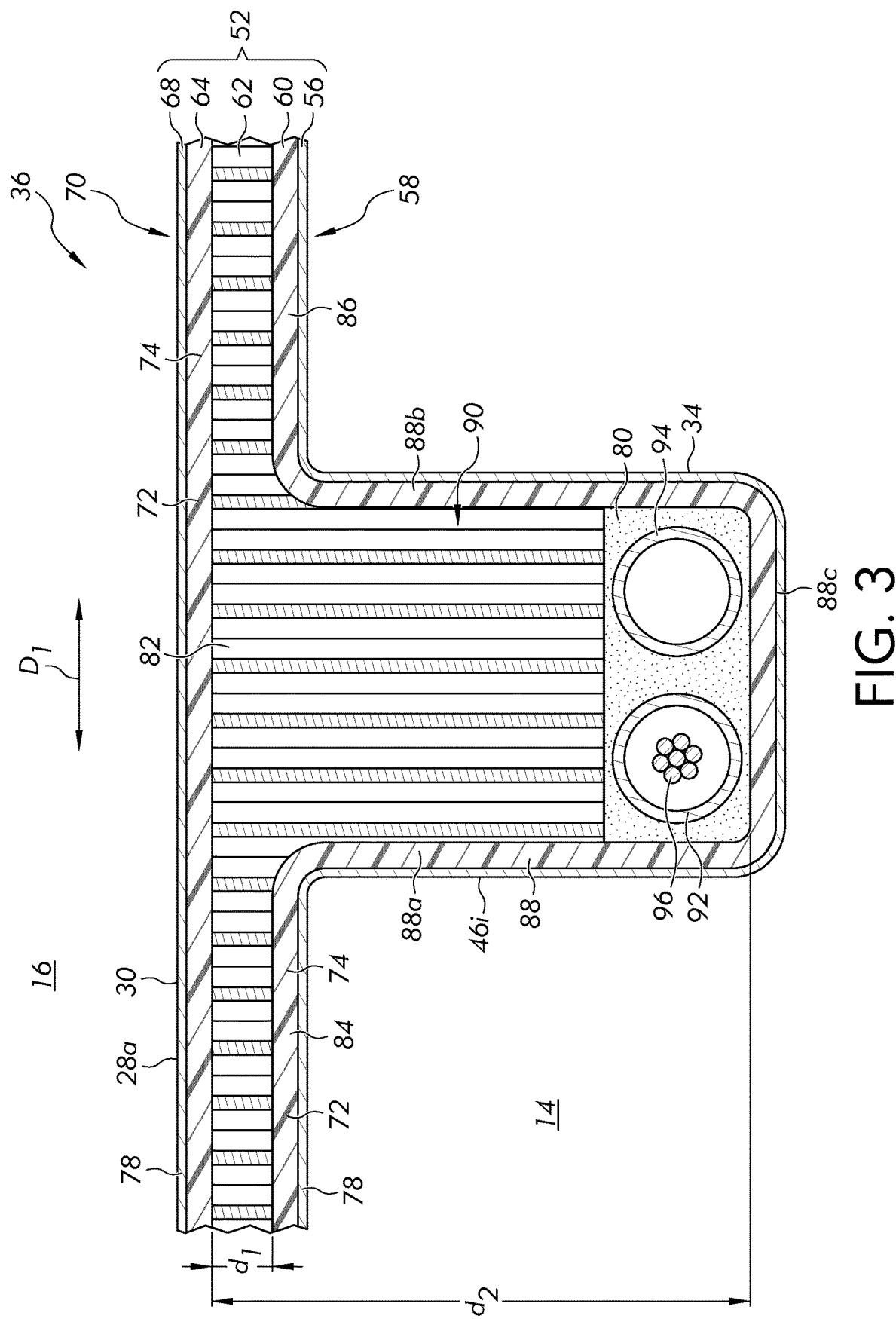
FIG. 3 is a schematic cross-section view of the recreational vehicle taken along line 3-3 in FIG. 2.

As noted above, the shell member 28a and chassis 34 are integrally molded together as components of a single, integrated body 36. A construction of the body 36 will now be described with reference to FIG. 3, which shows a cross-section of the body 36 taken along section line 3-3 in FIG. 2, the section line 3-3 being orthogonal to the longitudinal direction $D_2$ of the rib 46i. As shown in FIG. 3, the body 36 comprises a plurality of layers 52 that are stacked and bonded together to form the shell member 28a and chassis 34. The plurality of layers 52 includes a first gelcoat layer 56 that defines an exterior surface 58 of the body 36, a first fiber-reinforced-plastic (FRP) layer 60 that is disposed on an interior side of the first gelcoat layer 56, a core layer 62 that is disposed on an interior side of the first FRP layer 60, a second FRP layer 64 that is disposed on an interior side of the core layer 62, and a second gelcoat layer 68 that is disposed on an interior side of the second FRP layer 64 and defines an interior surface 70 of the body 36.

For the purposes of this disclosure, the terms "exterior" and "interior" when describing features of the body 36 refer to a state of configuration relative to the exterior 14 and interior 16 of the cabin 12, respectively. For example, an "exterior surface" of a feature is a surface of the feature that faces the exterior 14, whereas an "interior surface" of a feature is an opposite-facing surface of the feature that faces the interior 16. As another example, an "exterior side" of a feature is a side of the feature in which the exterior 14 is situated, whereas an "interior side" of a feature is an opposite side of the feature in which the interior 16 is situated.

The FRP layers 60, 64 each comprise a fiberglass fabric 72 that is woven and impregnated with resin 74 in an uncured state and then cured to form the FRP layer. Alternatively, the FRP layers 60, 64 can comprise a composite formed by impregnating a mat of loose fibers (e.g., glass, Kevlar, carbon, etc.) with resin. Because the layers 60, 64 are formed with FRP, they can provide relatively high strength to the body 36 while being lighter in weight and/or smaller in thickness than other common materials for recreational vehicle construction such as aluminum. Moreover, the FRP layers 60, 64 can provide a corrosion free and chemically resistant barrier for the body 36.

The gelcoat layers 56, 68 each comprise a thin layer of resin 78 that serves as a finishing/protective coat for the body 36. Each layer of resin 78 can be 10 to 24 mils (i.e., thousands of an inch) thick and preferably, 18 to 20 mils thick, although other thicknesses may be possible. In some examples, each layer of resin 78 can be colored to provide a desired aesthetic appearance to the shell member 28a.

The core layer 62 in the present example comprises the combination of a foam layer 80 and a plastic honeycomb layer 82, both of which are light-weight layers that can add strength to the body 36 but at less expense than using additional or thicker FRP layers. However, the core layer 62 can comprise additional or alternative materials with similar or alternative benefits in other examples. Moreover, the core layer 62 can comprise a single material or a combination of more than two materials. For instance, the core layer 62 can comprise a single layer of balsa wood, which is a similarly light-weight material that can add strength to the body 36.

The layers 52 described above can be bonded together such that each layer 52 is directly bonded to its adjacent layer 52. For the purposes of this disclosure, two features are "directly bonded" to each other if they are bonded in direct contact with each other, or if they are both in direct contact with an intermediate layer of adhesive. For instance, in the present example, the FRP layer 60 is bonded in direct contact with the first gelcoat layer 56, the foam layer 80 and plastic honeycomb layer 82 are bonded in direct contact with the FRP layer 60, the FRP layer 64 is bonded in direct contact with the plastic honeycomb layer 82, and the second gelcoat layer 68 is bonded in direct contact with the FRP layer 64.

The resins described above can each comprise a thermosetting resin (e.g., epoxy, polyester, or vinyl ester) that is initially in fluid form and combined with a curing agent to cure the resin to a hardened state. For instance, one or more of the resins can comprise a polyester or vinyl ester resin that is combined with a peroxide catalyst (e.g., Conap and MEKP) at a catalyst-to-resin ratio of 0.05 to 3.00%. Curing time for such a mixture can be about 45 to 60 minutes. However, other types of resins, curing agents, mixture ratios, and/or curing times may be possible in other examples.

As shown in FIG. 3, the gelcoat layers 56, 68 and FRP layers 60, 64 are continuous layers, meaning that each layer is a single, molded body having a continuous constituency of material (or composite material). Moreover, the gelcoat layers 56, 68 and FRP layers 60, 64 follow the interior and exterior contours of the body 36. For example, the first FRP layer 60 has a first base portion 84 and a second base portion 86 that extend horizontally and form respective portions of the base 30. The first FRP layer 60 also has a rib portion 88 that forms a portion of the rib 46i and includes a first wall portion 88a that extends downward from the first base portion 84, a second wall portion 88b that extends downward from the second base portion 86, and a third wall portion 88c that extends from a lower end of the first wall portion 88a to a lower end of the second wall portion 88b. The rib portion 88 thereby defines a channel 90 that extends longitudinally along the rib 46i. Meanwhile, the second FRP layer 64 is spaced from the first FRP layer 60 and extends horizontally along the base 30 such that a vertical distance $d_1$ between the second FRP layer 64 and the base portions 84, 86 of the first FRP layer 60 is less than a vertical distance $d_2$ between the second FRP layer 64 and the third wall portion 88c.

It is to be appreciated that the body 36 can include additional, alternative, or fewer layers 52 than those described above. For instance, the body 36 can include additional FRP layers or core layers to help strengthen the body 36, and/or additional reflective layers such as aluminum to reflect heat from entering or exiting the cabin 12. In other examples, the body 36 may comprise a single layer (e.g., the first FRP layer 60).

Moreover, the body 36 can have similar configurations of layers 52 along other portions forming the shell member 28a and chassis 34. In particular, the body 36 can have the same configuration of layers 52 shown in FIG. 3 at other cross-sections orthogonal to any of the other ribs 46. Indeed, the body 36 can have a similar layered arrangement of layers 52 at any cross-section along the body 36, with possible changes to thicknesses and/or contours of the layers 52 depending on the specific location.

In some examples, the recreational vehicle 10 can further include one or more utility members that are at least partially encapsulated by the plurality of layers 52 of the body 36 (for the purposes of this disclosure, a "utility member" refers to a member that is configured to convey or provide a conduit for a utility of a recreational vehicle such as water, electricity, natural gas, engine fluids, etc.). For example, the recreational vehicle 10 in the present embodiment includes first and second conduits 92, 94 that are arranged within and extend longitudinally along the channel 90 of the rib 46i. A plurality of wires 96 extend through the first conduit 92 for conveying electricity. Moreover, the second conduit 94 is a pipe for conveying water. The conduits 92, 94 and wires 96 are encapsulated by the foam layer 80 as they traverse longitudinally along the channel 90 of the rib 46i.

It is understood that the utility member(s) encapsulated by the plurality of layers 52 can have portions (e.g., inlets, outlets, terminals, etc.) that are exposed and/or extend outside of the layers 52. Moreover, the utility member(s) can be encapsulated within other ribs 46 or regions of the shell member 28a (e.g., the base 30 or side walls 32). Broadly speaking, the recreational vehicle 10 can include any configuration of one or more utility members (e.g., pipes, tubes, wires, etc.) that are at least partially encapsulated by the plurality of layers 52.

Figure 4:
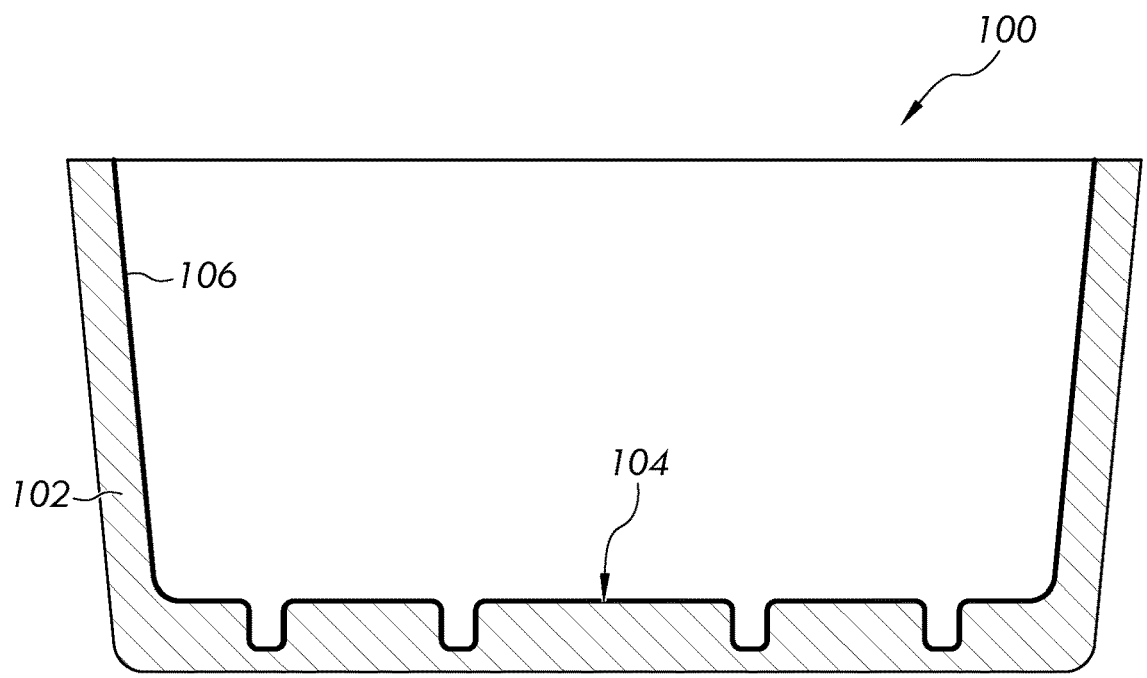
FIG. 4 is a schematic cross-section view showing a step of a method for forming a body of the recreational vehicle.

Turning to FIG. 4, a method 100 of constructing the body 36 will now be described. The method 100 includes providing a female (negative) mold 102 having an inner surface 104 that substantially matches the desired shape of the body 36. As discussed below, the body 36 is constructed by successively applying its layers 52 within the mold 102 along its inner surface 104. FIG. 4 shows a cross-section of the mold 102 that is configured such that the layers 52 once stacked therein will form a corresponding section of the body's base 30, side walls 32, and second ribs 46h-k. It is to be appreciated that other sections of the mold 102 will be appropriately configured to form other corresponding sections of the body 36. Moreover, prior to applying the layers 52, the method 100 preferably includes a step of coating the inner surface 104 of the mold 102 with a mold release agent 106, which will prevent the body 36 from bonding to the mold 102 as it is formed therein.

FIGS. 5-11 show subsequent steps of applying the layers 52 within the mold 102 to form the body 36. FIGS. 5-11 particularly focus on a section of the mold 102 that forms the cross-section of the body 36 shown in FIG. 3. However, it is to be appreciated that the layers 52 can be similarly applied along the rest of the mold 102 to form the rest of the body 36.

Figure 5:
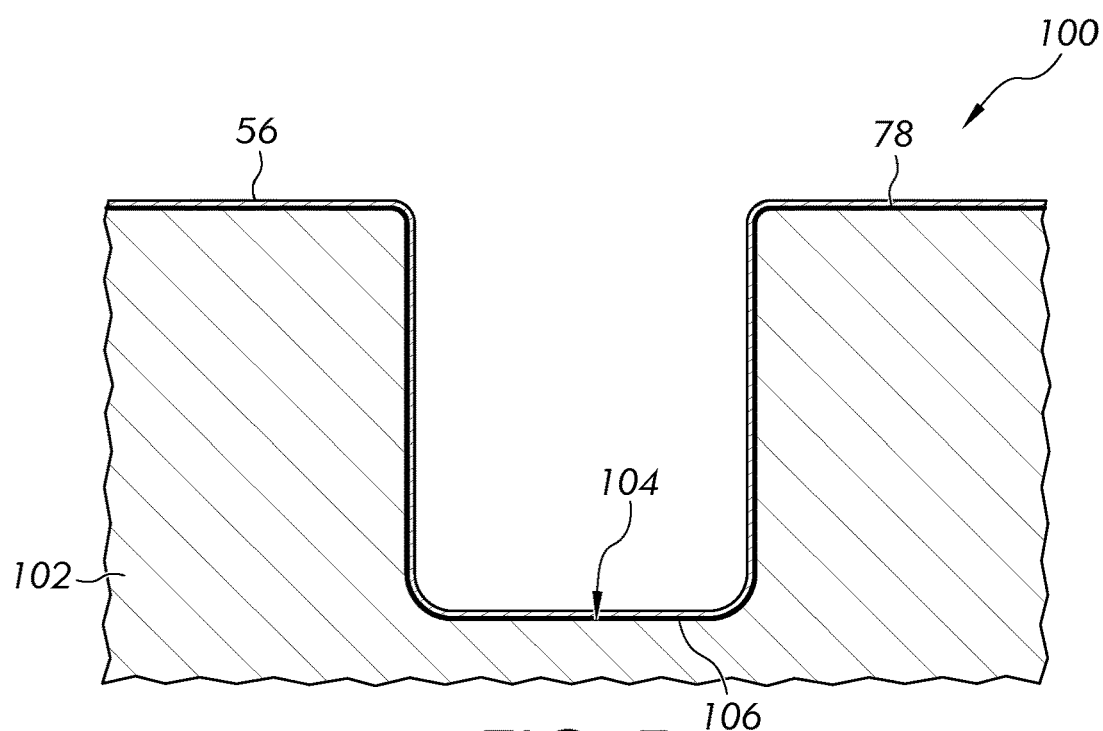
FIG. 5 is a schematic cross-section view showing another step of the method that is subsequent to the step shown in FIG. 4.
Figure 6:
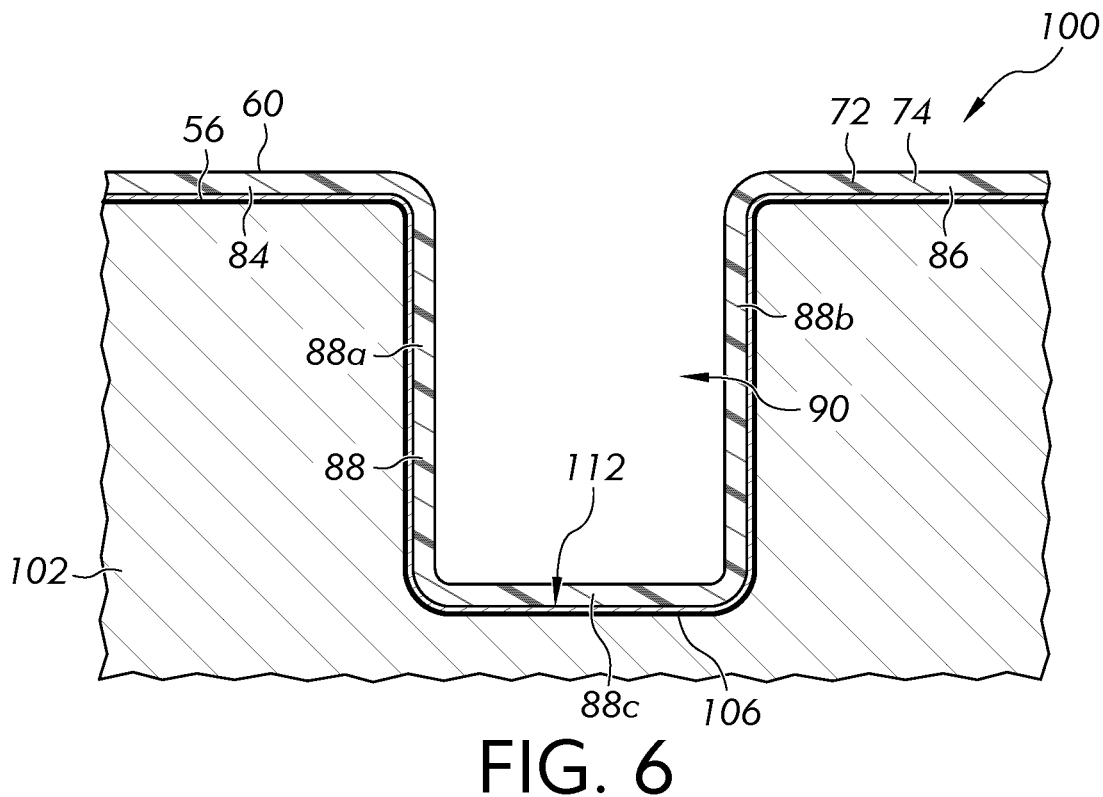
FIG. 6 is a schematic cross-section view showing another step of the method that is subsequent to the step shown in FIG. 5.

As shown in FIG. 5, the method 100 includes a step of applying the first gelcoat layer 56 along the inner surface 104 of the mold 102. In particular, the resin 78 can be applied along the lubricated inner surface 104 in an uncured state and then cured to form the first gelcoat layer 56. Once the gelcoat layer 56 is cured, the first FRP layer 60 can then be applied (see FIG. 6) against an interior surface 112 of the first gelcoat layer 56. In particular, the fiberglass fabric 72 can be applied against the interior surface 112 by placing the fabric 72 directly in contact with the interior surface 112 or by bonding the fabric 72 to the interior surface 112 with an intermediate adhesive. The resin 74 is then applied to saturate the fabric 70 and allowed to cure to complete the FRP layer 60.

The FRP layer 60 as applied will be directly bonded to the first gelcoat layer 56. Moreover, the gelcoat layer 56 and FRP layer 60 as applied in the mold 102 will be continuous layers that follow the contours of the mold's inner surface 104. In particular, the FRP layer 60 will include the first base portion 84, second base portion 86, and rib portion 88 discussed above, such that the rib portion 88 extends downward from the first and second base portions 80, 82 and defines the channel 90.

Figure 7:
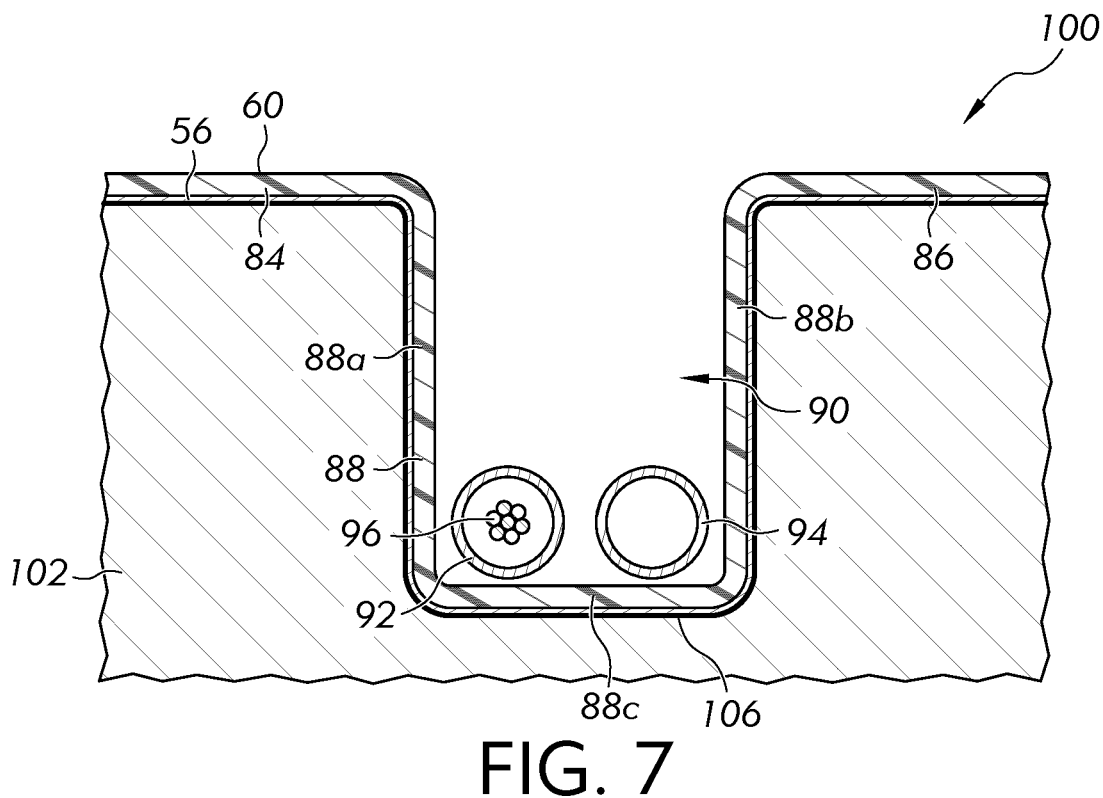
FIG. 7 is a schematic cross-section view showing another step of the method that is subsequent to the step shown in FIG. 6.

As shown in FIG. 7, the method 100 next includes a step of arranging the conduits 92, 94 within the channel 90 of the FRP layer 60. The conduits 92, 94 can extend longitudinally along an entire or partial length of the channel 90, and can include portions (e.g., inlets and outlets) that protrude out of channel 90. During this step, the wires 96 can also be fed through the conduit 92, although this can be done in later steps so long as the inlet and outlet of the conduit 92 are accessible.

Figure 8:
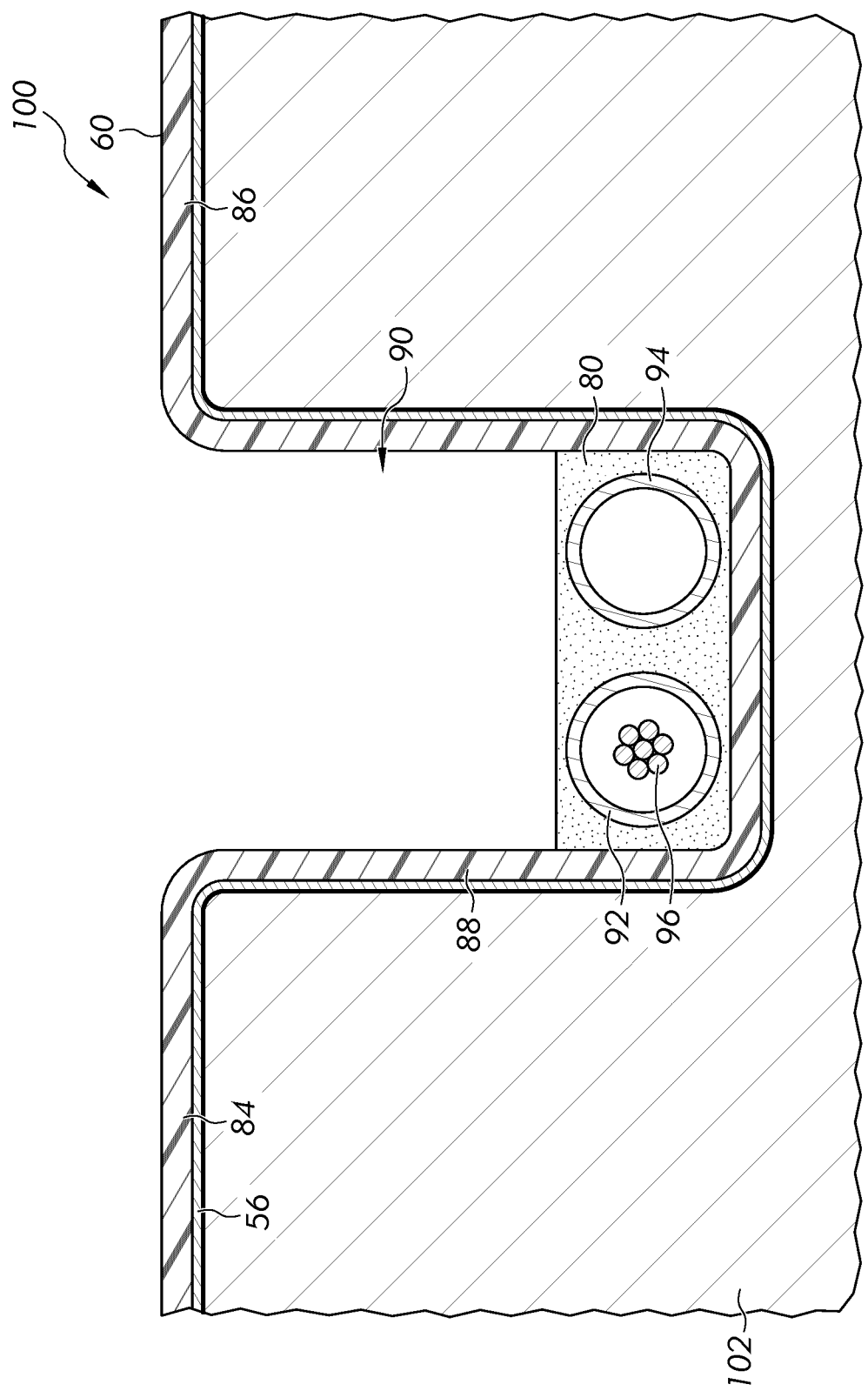
FIG. 8 is a schematic cross-section view showing another step of the method that is subsequent to the step shown in FIG. 7.
Figure 9:
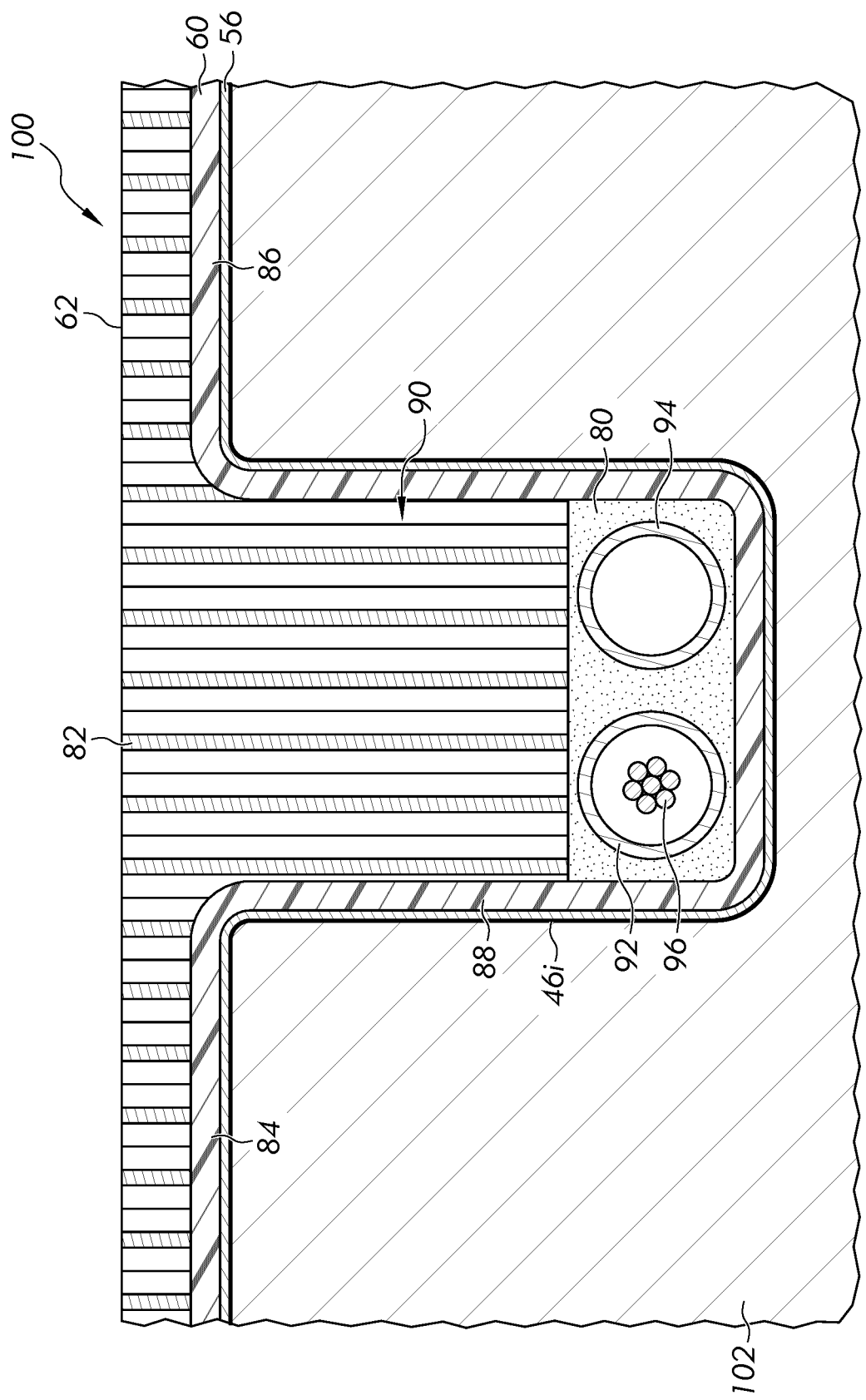
FIG. 9 is a schematic cross-section view showing another step of the method that is subsequent to the step shown in FIG. 8.

Once the conduits 92, 94 (and optional wires 96) are arranged within the channel 90, the foam layer 80 can be applied to encapsulate the conduits 92, 94 within the channel 90, as shown in FIG. 8. In particular, a spray foam can be applied within the bottom of the channel 90, which will then expand as it cures to fill the space around the conduits 92, 94 and form the foam layer 80. Before or after the spray foam completely cures, the plastic honeycomb layer 82 can be applied (see FIG. 9) within the remaining volume of channel 90 and across the base portions 80, 82 of the FRP layer 60, thereby completing formation of the core layer 62 and rib 46i.

Figure 10:
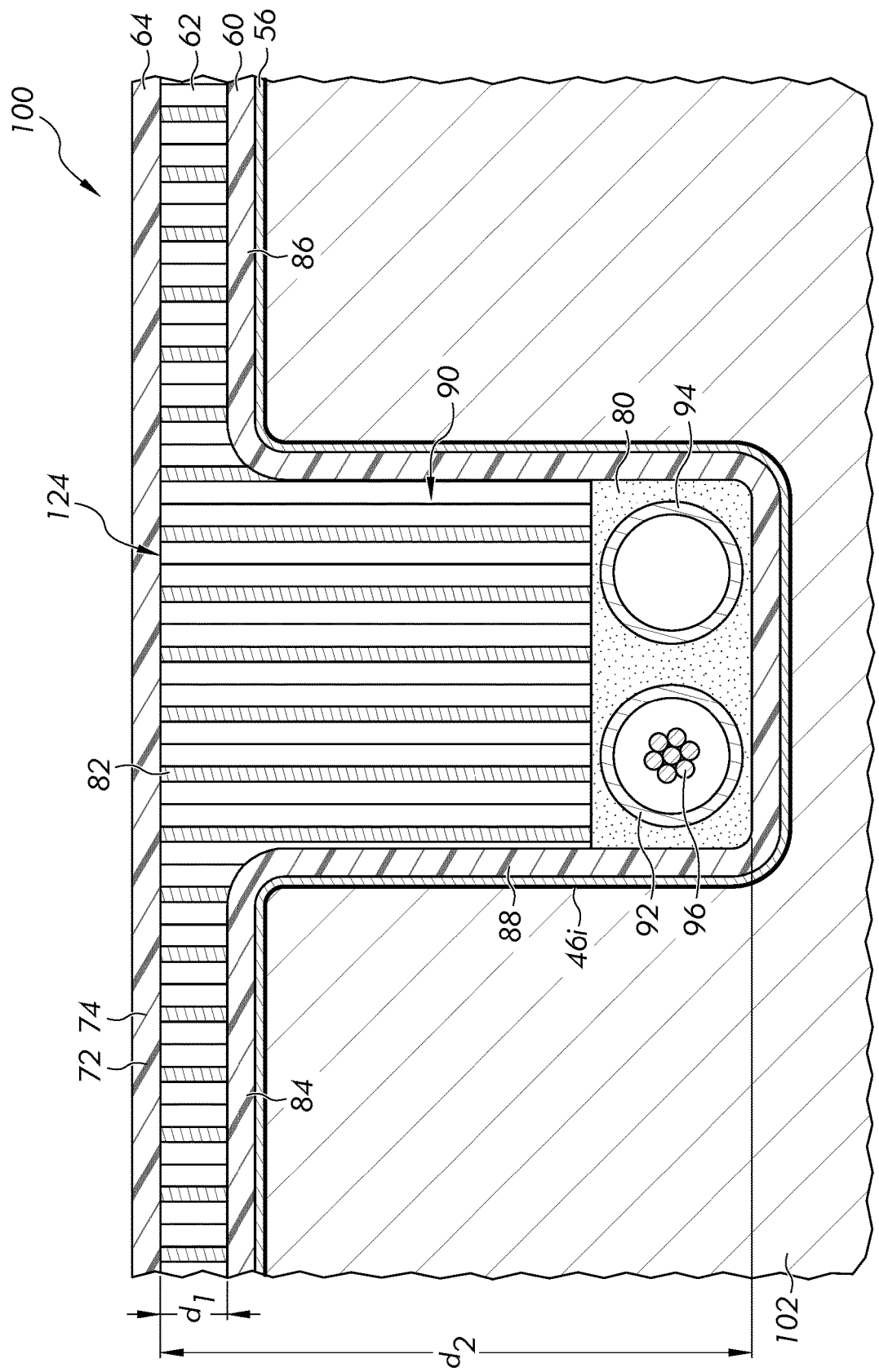
FIG. 10 is a schematic cross-section view showing another step of the method that is subsequent to the step shown in FIG. 9.

As shown in FIG. 10, the method 100 next includes a step of applying the FRP layer 64 against an interior surface 124 of the core layer 62. In particular, the fiberglass fabric 72 can be applied against the interior surface 124 by placing the fabric 72 directly in contact with the interior surface 124 or by bonding the fabric 72 to the interior surface 124 with an intermediate adhesive. The resin 74 is then applied to saturate the fabric 70 and allowed to cure to complete the FRP layer 64. The FRP layer 64 as applied will be directly bonded to the core layer 62.

Figure 11:
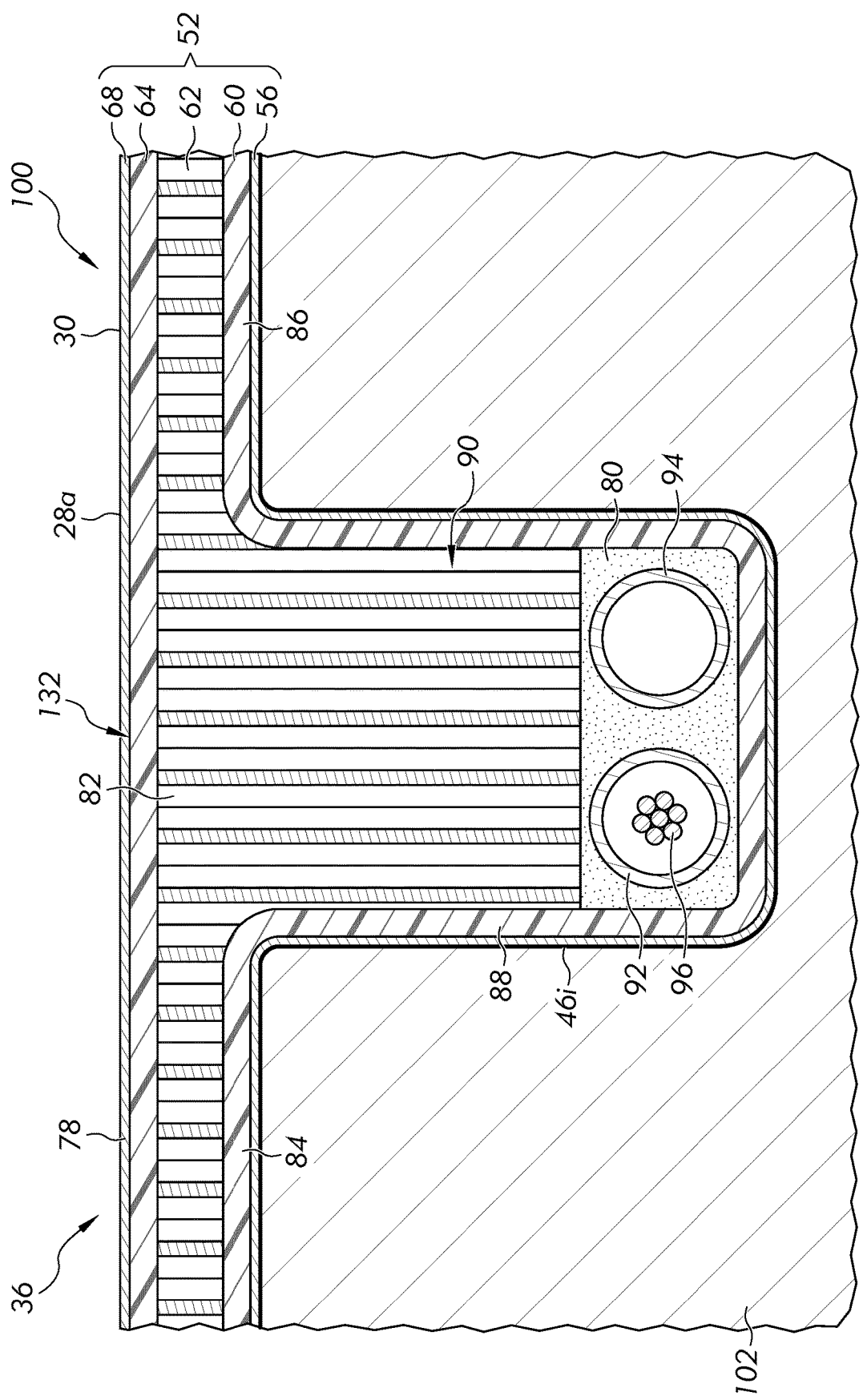
FIG. 11 is a schematic cross-section view showing another step of the method that is subsequent to the step shown in FIG. 10.

As shown in FIG. 11, the method 100 next includes a step of applying the second gelcoat layer 68 against an interior surface 132 of the FRP layer 64. In particular, the resin 78 can be applied against the interior surface 132 in an uncured state and then cured to form the second gelcoat layer 68. This will complete formation of the body 36, which can then be removed from the mold 102 and assembled with the shell member 28b to form the cabin 12 of the recreational vehicle 10.

In the method 100 described above, the resins will initially be uncured and mixed with a curing agent prior to application within the mold 102. For example, one or more of the resins can comprise a polyester or vinyl ester resin that is combined with a peroxide catalyst (e.g., Conap and MEKP) at a catalyst-to-resin ratio of 0.05 to 3.00%. Once mixed, the resin can be applied within the mold 102 (e.g., by spraying or brushing) and given time to cure to a hardened state. Curing time for such a mixture can be about 45 to 60 minutes.

The body 36 as described above is a single, integrally molded structure that includes the shell member 28a, chassis 34, and conduits 92, 94 as integrally molded components. In other words, the shell member 28a, chassis 34, and conduits 92, 94 are bonded together and/or encapsulated as a single, layered structure that is formed by molding. In particular, the body 36 will comprise certain layers that extend along and form portions of both the shell member 28a and chassis 34 (e.g., the gelcoat layers 56, 68, FRP layer 64, and plastic honeycomb layer 82). This integral molding of the shell member 28a, chassis 34, and conduits 92, 94 as components of a single, integrally molded body 36 can provide a variety of benefits compared to conventional recreational vehicles in which those components are separately formed and then assembled together.

For example, the labor required to mold the shell member 28a and then attach the shell member 28a to a separate metal chassis can be considerably greater than the labor required to simply mold the body 36 as described above so that it includes the shell member 28a and chassis 34 as integrally molded components. Moreover, by integrally molding the chassis 34 with the shell member 28a, the chassis 34 can be formed with materials such as FRP that are corrosion resistant, whereas a conventional metal chassis is susceptible to corrosion. Furthermore, the material costs of a metal chassis can be greater than the material costs of integrally molding the chassis 34 as described above, particularly if the metal chassis is purchased from another manufacturer. Accordingly, integrally molding the chassis 34 with the shell member 28a can reduce costs in both labor and materials, and result in a chassis 34 that is resistant to corrosion.

As another example, by encapsulating the conduits 92, 94 and/or other utility members at least partially within the layers 52 of the integrally molded body 36, the utility members can be concealed at least partially within the body 36, thereby protecting the encapsulated portions from damage and avoiding the need to install them in other areas inside or outside of the body 36 where space is limited and/or the presence of utility members is undesirable (e.g., the interior 16 of the cabin 12).

Illustrative embodiments have been described, hereinabove. It will be apparent to those skilled in the art that the above apparatuses and methods may incorporate changes and modifications without departing from the scope of this disclosure. The invention is therefore not limited to particular details of this disclosure, and will encompass modifications and adaptions thereof within the spirit and the scope of the appended claims.

What is claimed is:

1. A recreational vehicle body comprising:
    a base;
    a chassis integrally molded with the base, the chassis including a plurality of ribs that extend downward from the base; and
    a utility member,
    wherein the recreational vehicle body includes a plurality of layers that are molded to integrally form the base and chassis, wherein the plurality of layers comprises a first FRP layer that includes:
        a first base portion and a second base portion that extend horizontally and form respective portions of the base, and
        a rib portion that forms a portion of one of the plurality of ribs, the rib portion having a first wall portion that extends downward from the first base portion, a second wall portion that extends downward from the second base portion, and a third wall portion that extends from a lower end of the first wall portion to a lower end of the second wall portion,
    wherein the rib portion defines a channel, and the utility member is arranged at least partially within the channel, and
    wherein the plurality of layers comprises a foam layer within the channel that encapsulates at least a portion of the utility member.

2. The recreational vehicle body according to claim 1, wherein the utility member comprises an electrical wire.

3. The recreational vehicle body according to claim 1, wherein the utility member comprises a conduit member.

4. The recreational vehicle body according to claim 1, wherein the plurality of layers are stacked and bonded together to integrally form the base and chassis.

5. The recreational vehicle body according to claim 4, wherein the foam layer is disposed on an interior side of the first FRP layer, and the plurality of layers comprises a second FRP layer disposed on an interior side of the foam layer.

6. The recreational vehicle body according to claim 5, wherein the plurality of layers further comprises:
    a first gelcoat layer disposed on an exterior side of the first FRP layer and defining an exterior surface of the recreational vehicle body, and
    a second gelcoat layer disposed on an interior side of the second FRP layer and defining an interior surface of the recreational vehicle body.

7. The recreational vehicle body according to claim 1, wherein the plurality of ribs includes a plurality of first ribs, each first rib extending longitudinally in a first direction.

8. The recreational vehicle body according to claim 7, wherein the plurality of ribs includes a plurality of second ribs, each second rib extending longitudinally in a second direction transverse to the first direction.

9. The recreational vehicle body according to claim 1, wherein the plurality of ribs includes a first rib extending longitudinally in a first direction and a second rib extending longitudinally in a second direction transverse to the first direction.

10. The recreational vehicle body according to claim 1, wherein the plurality of ribs forms a frame and one or more crossmembers within the frame.

11. The recreational vehicle body according to claim 1, further comprising a plurality of walls that extend upward from the base, wherein the plurality of layers further forms the plurality of walls.

12. A recreational vehicle comprising:
    the recreational vehicle body according to claim 1,
    a door for providing selective access to an interior of the recreational vehicle body, and
    a plurality of wheels that support the recreational vehicle body.

13. The recreational vehicle body according to claim 1, wherein:
    the foam layer is disposed on an interior side of the first FRP layer, the plurality of layers comprises a second FRP layer disposed on an interior side of the foam layer, and
    at least a portion of the utility member is disposed on the interior side of the first FRP layer and an exterior side of the second FRP layer.

* * * * *